Patented Sept. 4, 1923.

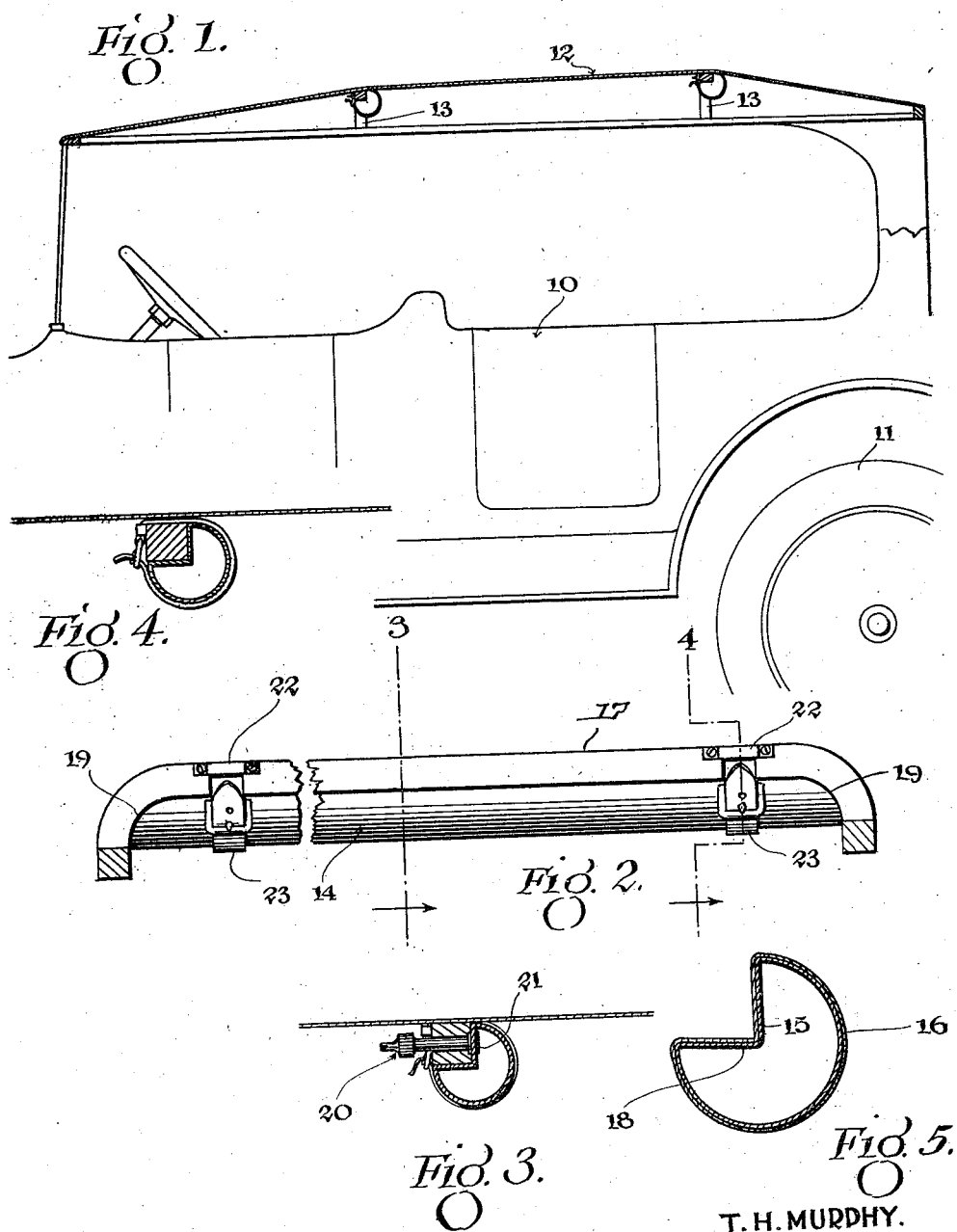

1,466,808

UNITED STATES PATENT OFFICE.

THOMAS HANNIBAL MURPHY, LOUIS SPRING ISBELL, AND ELMER WARREN SAWYER, OF NORTH ANSON, MAINE.

BOW PROTECTOR FOR AUTOMOBILE TOPS.

Application filed November 19, 1921. Serial No. 516,497.

*To all whom it may concern:*

Be it known that we, THOMAS H. MURPHY, LOUIS S. ISBELL, and ELMER W. SAWYER, citizens of the United States, and residents of North Anson, in the county of Somerset, in the State of Maine, have invented certain new and useful Improvements in Bow Protectors for Automobile Tops, of which the following is a specification.

This invention relates to a bow protector for automobile tops or the like.

It often occurs when an automobile of the touring type, or the like, in traveling over extremely rough roads that the persons occupying the rear seat are thrown upwardly and their heads striking one of the bows of the top and resulting in painful injury.

With the above in mind it is the object of the present invention to provide cushion protecting means for the bows of a top of an automobile and thereby avoid the possible injury above mentioned.

It is also an object of the invention that the cushion means be freely detachable from the bow.

Other objects relating to details of construction will hereinafter appear.

The invention is illustrated by way of example in the accompanying drawings, in which:—

Figure 1 is a partial side elevation of an automobile and showing in longitudinal vertical section the top thereof with which the invention has been applied, Figure 2 is a partial front elevation of one of the bows of the automobile top and showing the invention applied, Figures 3 and 4 are vertical sectional views taken substantially on the lines 3—3 and 4—4 respectively of Figure 2, and Figure 5 is a transverse sectional view of the protector, said section being taken at a point near the longitudinal center thereof.

Referring to the drawings more particularly, 10 indicates generally the body of an automobile, 11 the supporting wheels therefor and 12 the top. The top is supported in the usual manner, that is, by the bows 13.

In carrying out the invention there is provided an elongated sack generally indicated by the reference character 14, the walls of said casing comprising a casing of rubber as indicated at 15, Figure 4, which is totally covered by a layer of fabric as indicated at 16', the fabric 16 preferably being of the same color and texture as the inner covering of the top 12. The casing 14 as a whole is adapted to be fitted beneath the bridge portion 17 of a bow and having an indention extending the entire length thereof as at 18 and adapted to be fitted upon the rear end lowermost corner of the bow as illustrated in Figure 3. Also the ends of the casing are curved as at 19 in order that they may conform to the curvature of the bridge portion of the associated bow.

We also provide an air valve as generally indicated at 20 which may be of any desirable construction and which may be extended through the bow as shown in Figure 3 and then extended through the wall of the casing as at 21. The purpose of the valve is to inflate the casing 15. Also there is provided a pair of clips 22 which are channel shaped and which are secured to the bow as shown in Figure 2. Through each clip there is extended a strap 23, and said strap in each instance carrying a suitable buckle by which the casing may be secured to the bow.

It is thought from the foregoing description that the many advantages arising from the present invention are clearly understood and apparent and no further comment is here necessary.

While I have shown a particular application of my invention, it is to be understood that I am not to be so limited. It is obvious that the invention may be used with equal advantages for other purposes.

We claim:—

A protector of the character described, comprising an elongated casing having flexible walls and having extending longitudinally thereof its entire length an indentation adapted to permit the casing to be fitted upon the lower side of the bridge portion of a bow for vehicle tops, means whereby the casing may be secured to the bow, and means whereby the casing may be inflated.

ELMER WARREN SAWYER.
THOMAS HANNIBAL MURPHY.
LOUIS SPRING ISBELL.